United States Patent [19]
Klaffenbach et al.

[11] Patent Number: 6,006,008
[45] Date of Patent: Dec. 21, 1999

[54] MOTOR DRIVE SYSTEM CONTROLLED BY A PHASE ACCUMULATOR AND METHOD THEREFOR

[75] Inventors: David Kurt Klaffenbach; Harald Portig, both of Versailles; Thomas Campbell Wade, Lexington, all of Ky.

[73] Assignee: Lexmark International, Inc., Lexington, Ky.

[21] Appl. No.: 08/865,431

[22] Filed: May 29, 1997

[51] Int. Cl.$^6$ .................................................. H02P 5/165
[52] U.S. Cl. ............................................. 388/813; 388/91
[58] Field of Search .................... 388/800–815, 388/911

[56] References Cited

U.S. PATENT DOCUMENTS

| | | | |
|---|---|---|---|
| 4,103,281 | 7/1978 | Strom et al. ............................ | 388/813 |
| 4,271,382 | 6/1981 | Maeda et al. ........................... | 318/318 |
| 4,989,073 | 1/1991 | Wagner .................................... | 358/19 |
| 4,996,699 | 2/1991 | Rudolph ................................... | 377/49 |
| 5,488,627 | 1/1996 | Hardin et al. ........................... | 375/204 |

OTHER PUBLICATIONS

IEEE Journal of Solid State Circuits, "A High Speed Direct Frequency Synthesizer, "Feb. 1980.
IEE Proceedings–G, "Single Chip 500MHz Function Generator," Feb. 1991.

*Primary Examiner*—David Martin
*Attorney, Agent, or Firm*—John A. Brady

[57] ABSTRACT

A high resolution speed control for a DC or BLDC phase-locked-loop (PLL) motor is provided. A phase accumulator sends a time varying frequency reference to the PLL input, where the average frequency sets the motor speed with a high degree of accuracy. A post divider is used to reduce the number of circuits required to implement the function.

21 Claims, 5 Drawing Sheets

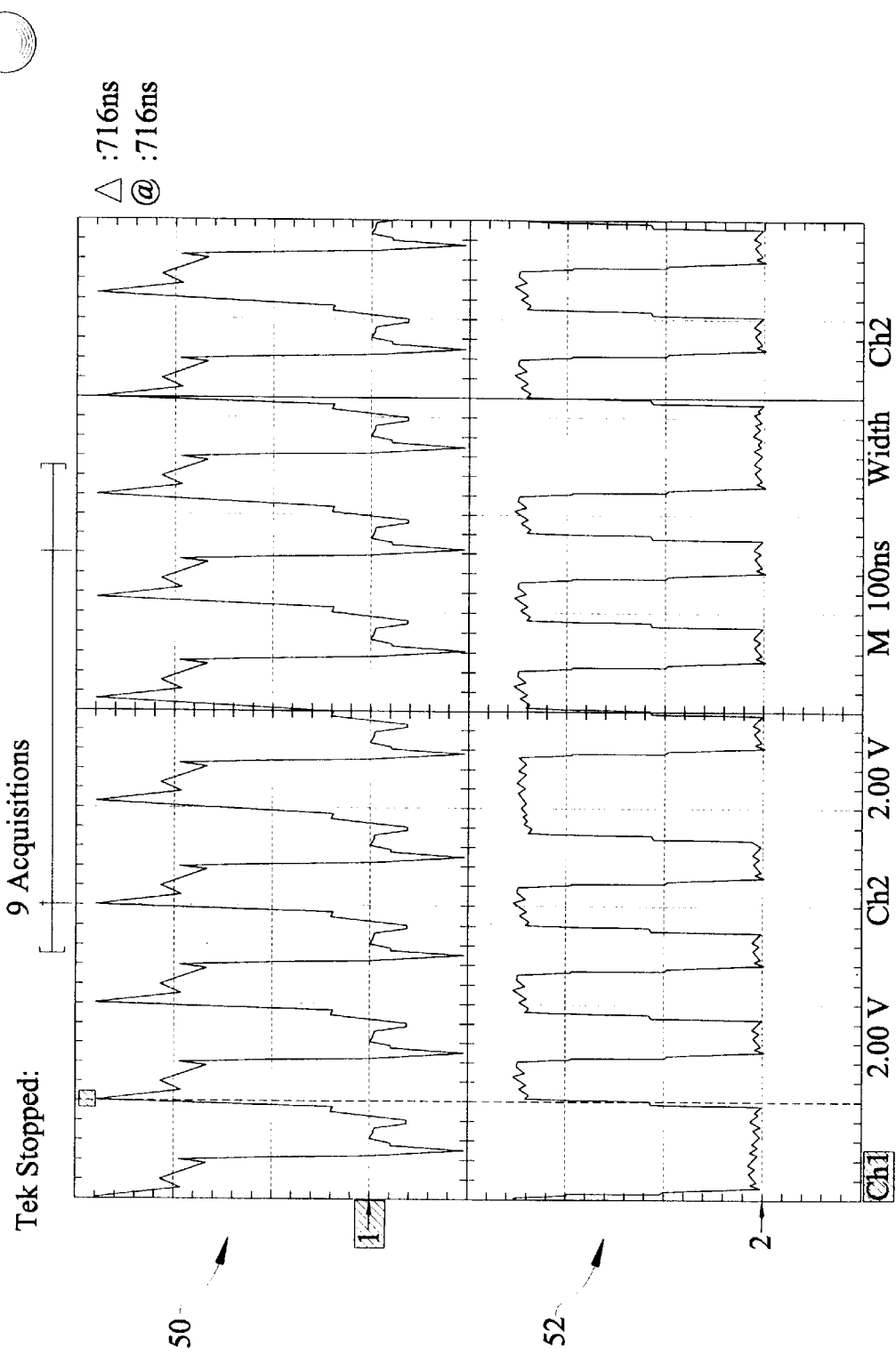

MOTOR DRIVE SYSTEM CONTROLLED BY A PHASE ACCUMULATOR AND METHOD THEREFOR

BACKGROUND OF THE INVENTION

1. Field of the Invention

The present invention relates to an apparatus and method for the control of a phase-locked-loop motor drive system using a phase accumulator. The system allows high resolution velocity control of a commodity integrated brushless DC motor assembly designed for single speed operation with very minor modification.

2. Description of the Prior Art

Various brushless DC (BLDC) motors have been considered for use in laser printers. One such BLDC is particularly cost effective and includes drivers and speed control circuitry on a circuit board that is integrated into the motor assembly. The circuit includes a crystal controlled oscillator that runs at a constant frequency. The governed speed of the motor is directly related to the frequency of the controlled oscillator and is therefore also constant.

In such a laser printer, the motor speed is varied precisely to achieve better print registration than can be achieved in fixed speed printing systems. Such higher print registration is required by customers, particularly those using high resolution modes and those using preprinted forms applications. A fixed-speed motor would be unacceptable. However, it is desirable to use a motor that is derived from the existing fixed-speed motor with minor modifications to take advantage of the cost effectiveness of the fixed-speed motor while simultaneously getting the benefit of speed control.

The crystal oscillator in these motors runs typically at a frequency of several megahertz. Such a clock signal is then typically divided down to form a reference frequency for a phase-locked loop (PLL). This reference frequency is then compared in the PLL to a feedback frequency which is typically either a signal from an encoder attached to the rotor of the motor or a signal generated from the voltage induced by the permanent magnets of the motor as they pass over circuit traces etched into a nearby circuit board. The frequency division is carried out by a binary counter which, for example, may have from 10 to 14 stages, thus dividing by factors varying from 1,024 to 16,384.

One can control the speed of the motor described above by replacing the fixed signal from the crystal oscillator with a signal whose effective frequency can be varied. The motor speed will then be proportional to the clock frequency. The new signal could be supplied to the motor from an external source. Thus, the only required change to existing, single-speed commodity BLDC motor assemblies is the replacement of the on-board fixed frequency crystal or oscillator circuit with an off-board signal connection.

The resolution of the control achievable by the variable frequency is limited by the resolution of the source of the clock signal. When the speed needs to be controlled accurately, it becomes difficult to derive proper frequencies from the clock signals that are available in typical motor controllers.

Various methods have been used in the past to obtain high-resolution velocity control of DC and BLDC motor systems.

The most common approach utilized in DC motor control systems is to provide a low frequency reference clock to the PLL. For example, such an arrangement has been used in Lexmark's mirror motor control systems for both the 4039 and Optra printers. In such a system, either discrete motor drivers are used, or a motor driver capable of receiving a low frequency reference must be used. However, either of these approaches may be significantly more expensive, depending on the motor frequency, torque required, and various other system considerations.

An earlier approach to providing a variable high speed reference is described in U.S. Pat. No. 4,271,382 to Maeda et al. In the Maeda et al system, the output clock frequency is usually equal to half of the input crystal frequency. Occasionally, however, the output clocks may be suppressed for a number of cycles to slow the average clock rate. Alternatively, the output clocks may occasionally be switched from the divide-by-two of the input crystal to the input crystal itself, having the effect of speeding the average clock rate. In either case, the speed correction is performed at a rate equal to the rate of the reference frequency observed by the PLL. Such a clock-clobbering/clock-insertion approach produces an irregular waveform which would subject the motor system to serious frequency perturbations (i.e. jitter) during ramp-up and ramp-down times. In addition, switching the clock of a synchronous digital system onto the output waveform is inherently prone to creating glitches on the output which may be a problem for EMC and might be observed as a false additional clock by the subsequent logic.

Another approach to performing precise speed control of a BLDC motor is to generate a low frequency reference clock using conventional dividers from a crystal-based clock, and to use a frequency multiplier PLL circuit to generate a high frequency signal which is locked to the low frequency reference. The high frequency reference is then used as the reference input to a motor control system. Such a type of dual-PLL system has been implemented in commercially available integrated circuits, but not in an integrated package with the necessary drive electronics. Therefore, a system built around the dual-PLL will have a higher number of components.

SUMMARY OF THE INVENTION

These and other deficiencies of the prior art are addressed by the present invention which is directed to an apparatus and method of achieving high resolution speed control when the resolution of available clock signals is limited. The method of the present invention can be implemented with an off-the-shelf or existing integrated BLDC motor, ensuring proper operation.

The present invention makes use of a simple counter circuit embedded within existing arbitrary-waveform-generators (AWG) and direct frequency synthesizers, sometimes referred to as direct-digital-synthesizers (DDS). The modified counter circuit is called a phase accumulator, and is described for use in waveform synthesis applications in articles by Saul et al (IEEE Journal of Solid-State Circuits, Vol. 25, No. 1, February 1990) and (IEE Proceedings-G, Vol. 138, No. 2, April 1991).

BLDC motors provide more power and are quieter than conventional DC motors. In the context of a laser printer, motor speeds are changed to: half speed to print at 1200× 1200 resolution; at final manufacture to correct margins (compensating for adverse tolerance accumulations); and to compress pre-existing data which assumes printing on a somewhat larger page than the laser printer can fill.

An object of the present invention is to provide a high resolution speed control for fine tuning a laser printer process speed to achieve the best print quality and performance.

Another object of the present invention is to allow multiple operating points to be performed using the same hardware.

Still another object of the present invention is to provide a high resolution speed control for a DC or BLDC phase-locked-loop (PLL) motor.

Yet another object of the present invention is to provide a phase accumulator which sends a time varying frequency reference to the PLL input, where the average frequency sets the motor speed with a high degree of accuracy.

Another object of the present invention is to reduce the number of circuits required to implement the function by providing a post divider.

Still another object of the present invention is to provide high resolution control of speed.

Another object of the present invention is to achieve real time speed control.

Yet another object of the present invention is to provide a robust design which will reduce engineering time in the future.

BRIEF DESCRIPTION OF THE DRAWINGS

These and other attributes of the present invention will be described with respect to the following drawings in which:

FIG. 5 is an illustration of oscilloscope waveforms of an ideal output waveform from a conventional clock and a waveform obtained using the circuit of present the invention.

DETAILED DESCRIPTION OF THE INVENTION

Figure 1A:
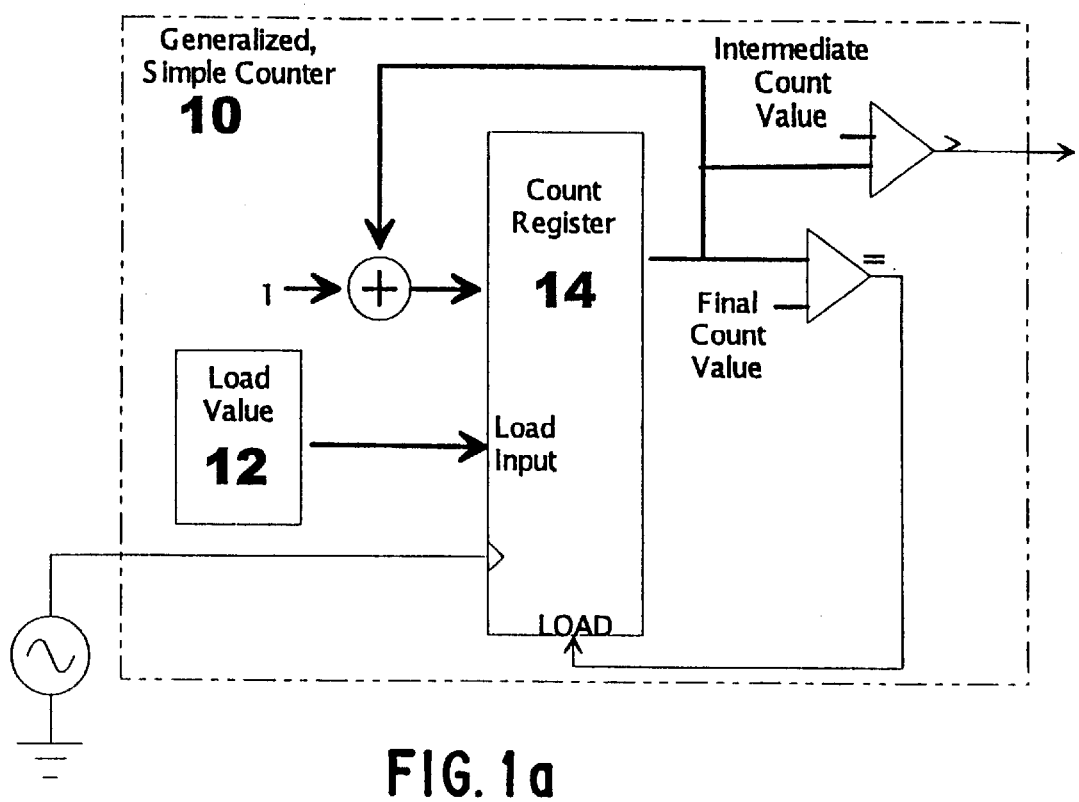
FIG. 1a is a schematic diagram illustrating a generalized simple counter.

Referring to FIG. 1a, a simple counter circuit 10 is illustrated. An initial value 12 is loaded into the count of the count register 14, and the current count is then incremented by a value of one on each clock cycle. When the count register 14 reaches a given final value, the initial value is reloaded and the cycle repeats. The foregoing causes the typical counter 10 to increment (or decrement) by one from the initial value through the final value, forming a fixed cycle of operation. By comparing the count of a typical counter 10 to an intermediate comparison value between the initial and final count values, a regular waveform is obtained from the counter 10 whose output frequency is equal to the clock frequency divided by the total number of counts in a cycle.

Figure 1B:
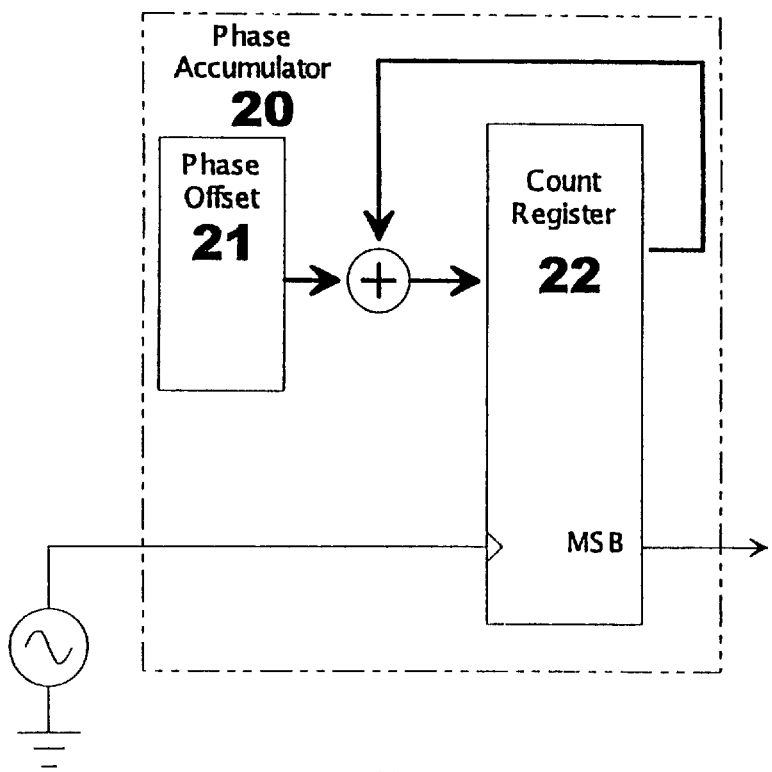
FIG. 1b is a schematic diagram, illustrating a phase accumulator.

The basic operation of the phase accumulator 20, shown in FIG. 1b, is similar to that of the simple counter 10, except that the count is incremented on each clock cycle by a selectable amount provided by phase offset 21 instead of a fixed increment of one. In addition, rather than reload an initial value at some point throughout the cycle, the phase accumulator never reloads. Thus, once the maximum count value is exceeded, the bits of the count above the most-significant bit (MSB) of the counter are truncated, leaving only the remainder in the count register 22. This function can be described as:

$Count_{t+1} = (Count_t + Phase\ Offset)\ modulo\ 2^n$, where

Phase Offset=the amount to increment on each count, and
n=the number of bits in the count.

On the following cycle, the count register 22 continues incrementing from the leftover value of the previous cycle. Such accumulation of information from the previous cycles provides a memory effect that is key to its operation. The count may be utilized in multiple ways, but the simplest for generation of a binary output is to tap off the MSB of the count. Different combinations of bits, such as the second most-significant bit, the least most-significant bit, or any combination of such bits may be used to develop the binary output. The output waveform obtained from the MSB of the count is an irregular waveform which, over a long period, produces an average output frequency of:

$F_{MSB\ avg} = (F_{CLK} * Phase\ Offset)/2^n$, where $F_{MSB\ avg}$=the average output waveform frequency over $2^n$ clock cycles, $F_{CLK}$=input clock frequency, Phase Offset=the amount to increment on each count, and
n=the number of bits in the count.

While the waveform produced is irregular from one output transition to the next, the entire cycle does repeat at least every $2^n$ clock cycles. Also, the useful range of the Phase Offset is 1 to $2^{n-1}$, since a Phase Offset x greater than $2^n$ creates a pattern which is matched by a Phase Offset y, where y=$2^n$-x, each frequency from $2^{n-1}$ to $2^n$ has an identical mate in the range from 1 to $2^{n-1}$. This limitation to the Phase Offset produces an output frequency range from $F_{CLK}/2^n$ to $F_{CLK}/2$. Since resolution of the output frequency is the change in frequency produced by a change in the Phase Offset of one, the resolution in Hertz is $F_{CLK}/2^n$. Accordingly, absolute resolution is increased by increasing the size of the counter.

The function of the phase accumulator 20 can best be envisioned with a simple example. Assume that we have a 3-bit counter with a count value which ranges from zero to seven (binary 000 to 111). Further, assume that the Phase Offset chosen for the count is three (binary 011). Thus the count for the next cycle equals 3 plus the count for the previous cycle, modulo 8. If the initial value of the count register 22 is zero, the phase accumulator count value would increment by three on each clock through the following values:

0, 3, 6, 1, 4, 7, 2, 5, 0 . . . (the MSB, of course, is 1 for values 6, 4, 7 and 5)

Over an entire cycle of 8 counts, the average output frequency of the MSB of the count is:

$F_{MSb\ avg} = (F_{CLK} * 3)/8$.

Figure 2:
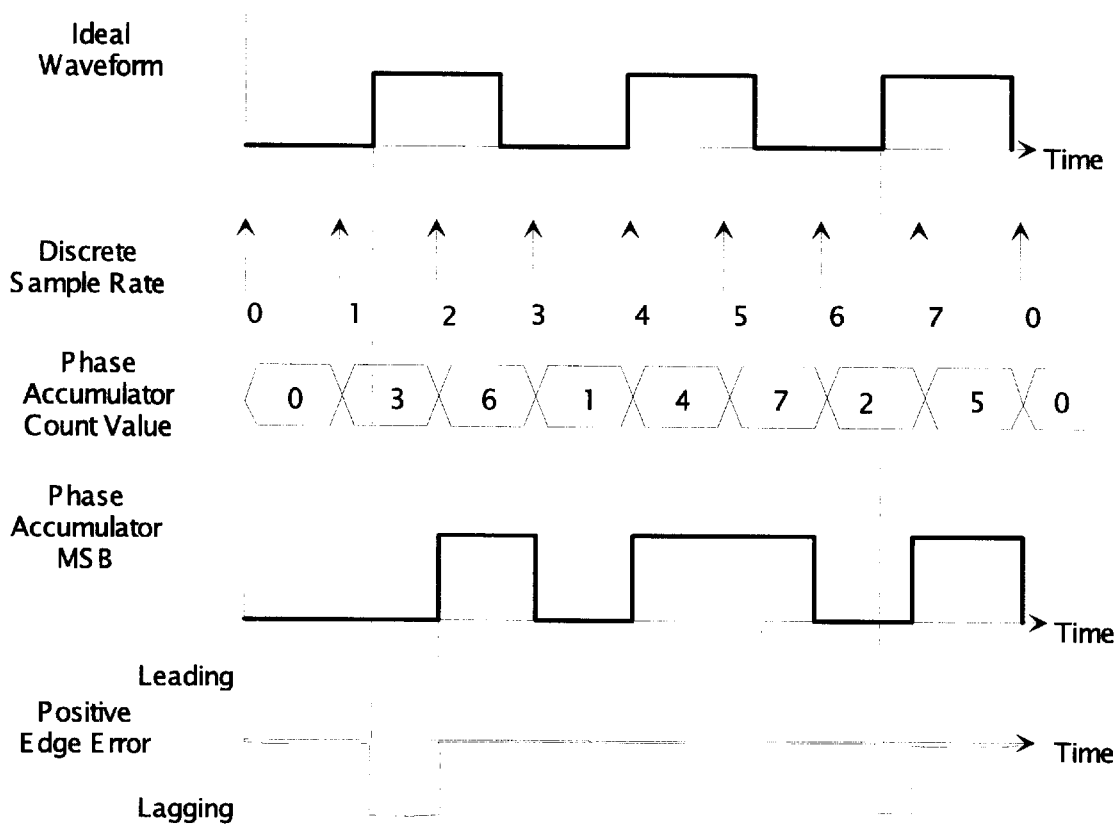
FIG. 2 is an output waveform diagram.

The output waveform is shown in FIG. 2, which contrasts the waveform obtained to an ideal clock operating at ⅜ of the frequency of the input clock waveform. In addition, FIG. 2 shows the magnitude and duration of the cumulative edge-rate error in positive edges of the clock.

As shown in FIG. 2, the waveform output obtained is somewhat irregular. However, the rate at which rising edges occur is still fairly regular, as opposed to the clock-clobbering/clock-insertion scheme set forth in the Maeda et. al patent. In that scheme, the cumulative edge rate error can become a very large number. Using the Phase Accumulator approach, each edge of the output waveform occurs within one clock cycle (or discrete sample) of when the edge would occur using an ideal frequency reference. The foregoing is the best possible performance that can be obtained using a digital circuit whose clock frequency is a non-integer multiple of the desired output frequency.

Figure 3:
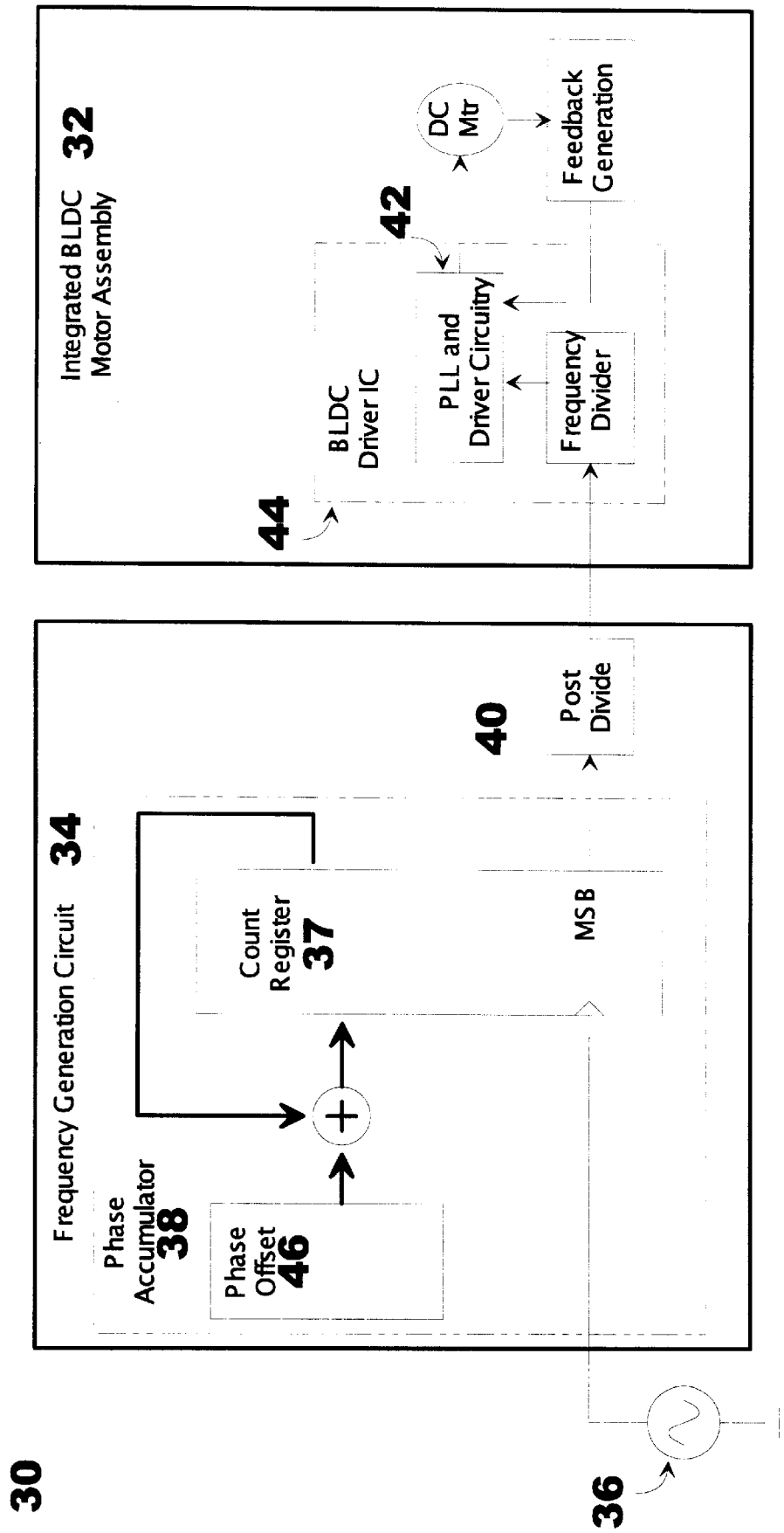
FIG. 3 is a schematic diagram of the present invention.

An implementation of the present invention is illustrated in FIG. 3. The BLDC system 30 includes an integrated BLDC motor assembly 32 controlled by a reference frequency generation circuit 34 which includes a crystal oscillator 36, a phase accumulator 38, with a 14 bit counter 37 and a selectable post divide 40 of the phase accumulator MSB.

While FIG. 3 and the specification refer to an integrated motor assembly 32 that uses a PLL 42 to govern the velocity, other velocity governing methods exist. Prominent among such approaches is that of a speed discriminator system, commonly used in DC motor control integrated circuits. The present invention applies equally well to such types of systems.

The post divider 40 shown in FIG. 3 is a key feature in preserving the overall speed accuracy over as wide a range as possible. The post divide 40 allows the output of the phase accumulator 38 to optionally be divided by a factor of 2, 3, 4 or passed through directly (i.e. divide-by-1 mode). As a result, the resulting reference clock sent to the BLDC motor assembly 32 will have an average output frequency of:

$$F_{REFCLK\ Avg} = (F_{CLK} * \text{Phase Offset})/(2^n * \text{Post Divide}), \text{ where}$$

$F_{REFCLK\ Avg}$=the average frequency reference sent to the BLDC motor assembly, $F_{CLK}$=the input clock frequency, Phase Offset=the amount to increment on each count, and n=the number of bits in the count, and Post Divide=an integer number from 1 to 4.

Thus, the motor shaft frequency which results from the system illustrated in FIG. 3 is determined by the following formula:

$$F_{MOTOR} = (F_{CLK} * \text{Phase Offset})/(2^n * \text{Post Divide} * \text{Motor IC Frequency Divide} * \text{Motor Feedback Ratio}), \text{ where}$$

Motor IC Frequency Divide=a divide ratio set inside the BLDC driver IC, usually ranging from 1,024 to 16,384, Motor Feedback Ratio=the ratio between cycles of the encoder, Hall-effect, or Frequency Generated feedback waveform per complete cycle of the motor shaft, typically ranging from 3 to 50.

Post Divide Advantages in Error Reduction:

As described previously, the Phase Accumulator 38 has a frequency range from $F_{CLK}/2^n$ to $F_{CLK}/2$ with a resolution of $F_{CLK}/2^n$. The absolute resolution is constant over the range of the output frequencies, but, in many applications, it is the relative resolution which is important. The relative resolution is defined here as the percentage of change in the output frequency caused by changing the output frequency by the minimum possible amount, or absolute resolution. For the Phase Accumulator 38, the relative resolution is inversely proportional to the output frequency. Therefore, if an output frequency is chosen which is one-half of the maximum output frequency, the relative resolution is made twice as coarse. Similarly, if an output frequency is chosen which is one-tenth of the maximum output frequency, the resolution is made ten times as coarse.

By employing a programmable binary divider stage as the post divide 40 between the Phase Accumulator 38 and the motor control circuit 44, the degradation in the relative resolution can be minimized to a factor of two or less over a number of octaves equal to the number of bits in the binary divider plus one. Any divider placed on the output of the phase accumulator 38 will reduce both the output frequency and the absolute resolution by the same factor. Thus, when a divider is employed so that the phase accumulator 38 is always operated in its highest octave of operation, the relative resolution will always be greater than $2^{n-1}$ or as a percentage, $100\% * (2^{n-1})$. The accumulator can be operated at lower values of phase offset at the expense of relative resolution.

As with the undivided phase accumulator MSB signal, the maximum timing error of the output signal is limited to plus or minus one half of one period of the phase accumulator 38 input clock 36, when compared to an ideal clock with the same average phase. If it is compared to an ideal clock of random phase, then it can be said that the timing error will have a maximum total range of one period of the phase accumulator 38 input clock 36.

Figure 4:
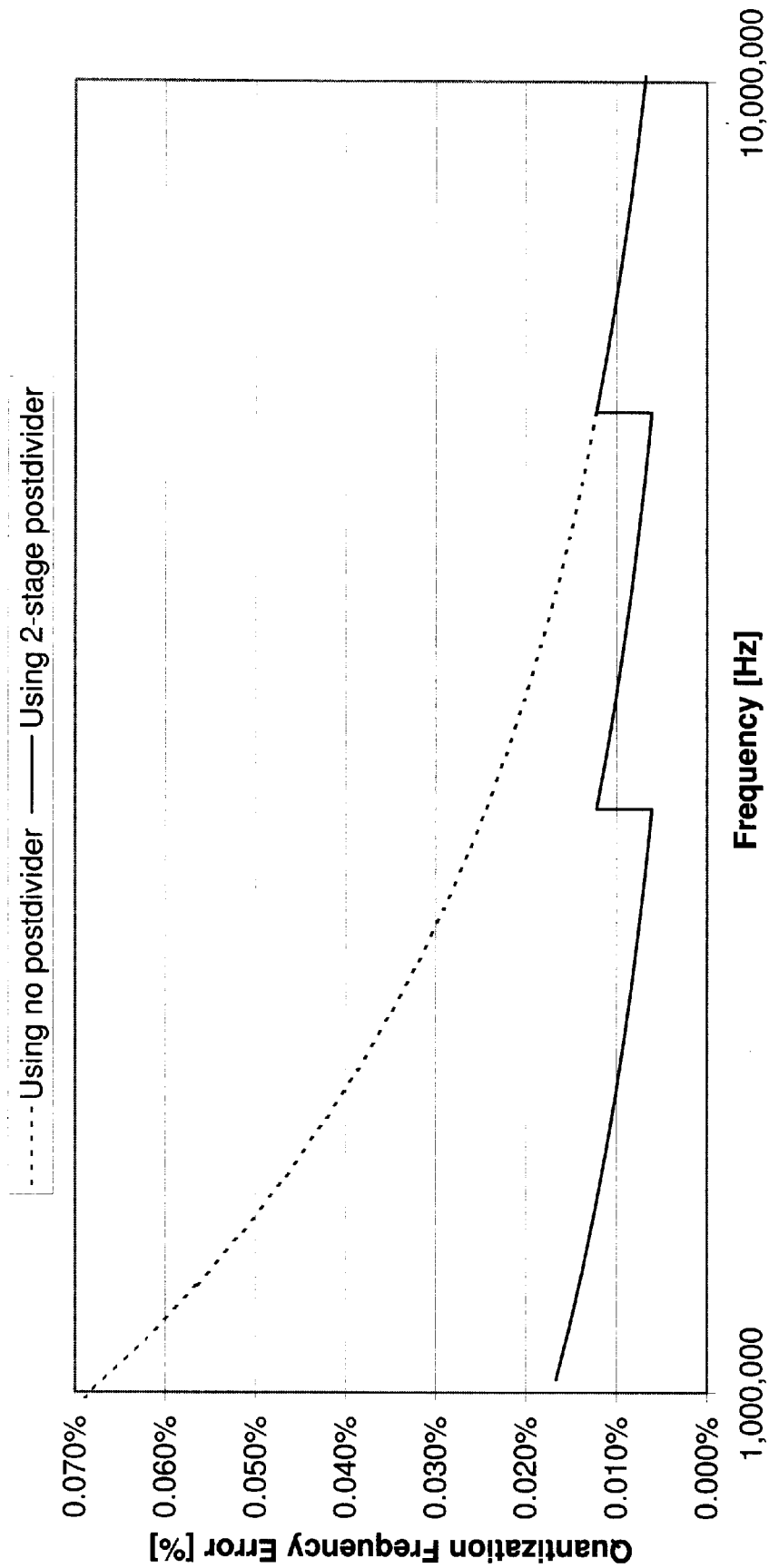
FIG. 4 is a graph showing frequency error versus output frequency.

The effect of the phase accumulator 38 on the resulting frequency error obtained is shown in FIG. 4. FIG. 4 depicts the reduction in error obtained by the post divide 40 for division by 1 (right segment) division by 2 (center setment) and division by 4 (left segment). Effectively, the post divide 40 allows the phase accumulator 38 to operate with Phase Offset values from $2^{n-2}$ to $2^{n-1}$. Since the post divide 40 allows the Phase Offset 46 to operate at high values, the jump of a step (a step being the frequency difference when a Phase Offset is increased by 1) produces less relative error in the output velocity. The quantization frequency error (i.e., maximum unavoidable error) is equal to half of the step in the output frequency divided by the output frequency times 100%, or:

$$\frac{1/2[(F_{CLK}/2^n)*(\text{Phase Offset}+1) - (F_{CLK}/2^n)*(\text{Phase Offset})]}{[(F_{CLK}/2^n)*(\text{Phase Offset}+\text{Phase Offset}+1)]1/2} * 100\%, \text{ which for}$$

large Phase Offset can be simplified to:

Quantization Frequency Error=$(1/(2*\text{Phase Offset}))*100\%$

Note that while FIG. 4 only shows use of divided ratios of 1, 2, and 4, other integer values could be used.

The oscilloscope waveforms shown in FIG. 5 contrast an ideal 9.786 MHz output waveform 50 from a conventional clock versus the waveform 52 obtained using the subject circuit with a 22.368 MHz clock frequency to generate a 9.786 MHz average clock waveform. The example illustrated repeats every 16 edges of the base clock. In this example the post divide is not used. During this time, seven rising edges of the output waveform are produced. The cursors in the example shown in FIG. 5 show that over the time period during which seven complete cycles of the conventional clock occur, seven complete cycles of the subject circuit also occur. Other examples will repeat in greater or fewer cycles of the 22.368 MHz base clock, but the concept is the same. As discussed previously, never does the cumulative positive edge error exceed one input clock cycle.

EXAMPLE

One embodiment of the present motor system uses the following values:

$F_{CLK}$=22.36875 MHZ,

Phase Offset=any integer number from $2^{12}$=4096 to $12^{13}$=8192, n=14, so $2^n$=16,384, Post Divide=an integer number from 1 to 4

Motor IC Frequency Divide=$2^{13}$=8192,

Motor Feedback Ratio=45.

Thus, for this example, the waveform sent to the BLDC motor assembly is on average:

$$F_{REFCLK\ Avg}=(1365*\text{Phase Offset})/\text{Post Divide}.$$

The resulting motor shaft frequency is:

$$F_{MOTOR}=(22.36875\ MHZ*\text{Phase Offset})/(16384*\text{Post Divide}*8192*45),\text{ or}$$

$$F_{MOTOR}=\text{Phase Offset}/(270.01*\text{Post Divide})\ Hz$$

The useful motor frequency range for our application is approximately 13 to 40 revolutions per second.

To determine the error produced by the reference input to the PLL, we must consider the reference frequency generated inside the BLDC motor control IC, which is:

$$F_{REFERENCE}=(F_{CLK}*\text{Phase Offset})/(2^n*\text{Post Divide}*\text{Motor IC Frequency Divide}),\text{ or}$$

$$F_{REFERENCE}=\text{Phase Offset}/(6.000*\text{Post Divide})\ Hz$$

Over the desired operating range of the motor, the reference frequency will be approximately 500 to 1200 Hertz. To keep our final error at a minimum, as shown in FIG. 4, a Post Divide of 2 is chosen for reference frequencies from 500 to 683 Hz, and a Post Divide of 1 for frequencies from 683 to 1200 Hertz. Given a different Motor IC Frequency Divide or Motor Feedback Ratio provided by a different motor, other Post Divide values might be chosen.

To know how good the example system is when compared to an ideal clock, the two most significant errors are the Quantization Frequency Error and the Maximum Edge Timing Error.

As discussed, Quantization Frequency Error is equal to 1/(2*Phase Offset), and represents how far the average frequency of the system might be from the desired frequency as a result of having to choose an integer value for the Phase Offset. The Maximum Quantization Frequency Error (MQFE) occurs when the Phase Offset reaches its minimum value. With post divide the phase offset used can be a minimum of $2^{n-2}$ or 4,096. Thus, for a 14-bit accumulator used with a post divider, the MQFE is:

MQFE=(1/(2*Minimum Phase Offset))*100% =(1/8192) *100% =0.0122 %

The Maximum Edge Timing Error (METE) is the delay that may be observed in any given edge of the output of the system when compared to an ideal clock. Where Phase Offset is a minimum of $2^{n-2}$, METE is equal to one period of the input clock of the phase accumulator. In the example, METE=44.7 nS. So any given edge of the output signal may be delayed from an ideal signal by as much as 44.7 nS. In the case of a motor controller which uses a signal divided from the MSB output signal as a reference, this delay represents an occasional or random phase error to the motor system. In a case where the motor control PLL is operating at 1200 Hz (period=833 µS=0.0000536 cycles=0.00536%, or a minuscule amount.

Thus the subject circuit provides the needed function using commodity type parts without introducing a perceptible velocity error into the motor system.

Having described several embodiments of the present invention, it is believed that other modifications, variations and changes will be suggested to those skilled in the art in view of the description set forth above. For example, the present invention is not limited to motor control for just printers, but is equally applicable to conveyors, material handling apparatus, or any other situation requiring fine and real time motor control. The present invention is equally applicable to BLDC motors and other DC motors. Furthermore, the post divide can be an integer other than 1 to 4. It is therefor to be understood that all such variations, modifications and changes are believed to fall within the scope of the invention as defined in the appended claims.

What is claimed is:

1. An apparatus for high resolution speed control of a DC motor comprising;
    a motor control circuit; and
    a phase accumulator receiving a cyclical reference clock signal, said phase accumulator comprising a phase offset circuit and a count register, said count register incrementing at each cycle of said cyclical reference clock signal, wherein an amount said count register increments is greater than one and is determined by said phase offset circuit, so that said phase accumulator sends a frequency reference to an input of said motor control circuit to provide high resolution speed control of said DC motor.

2. An apparatus for high resolution speed control of a DC motor as recited in claim 1, further comprising a post divider for dividing an output of said phase accumulator by an integer of at least one, wherein an average frequency is provided to set a speed of said motor with a high degree of accuracy.

3. An apparatus for high resolution speed control of a DC motor as recited in claim 1, wherein said count register of said phase accumulator has a count which is incremented on each clock cycle by a variable amount.

4. An apparatus for high resolution speed control of a DC motor as recited in claim 3, wherein said phase accumulator never reloads, so that once a maximum count value is exceeded, bits of said count above a most-significant bit are truncated, leaving only a remainder, as defined as follows:

Count$_{t+1}$=(Count$_t$+Phase Offset)modulo $2^n$, where
   Phase Offset=an amount to increment on each of said count, and n=a number of bits comprising said count.

5. An apparatus for high resolution speed control of a DC motor as recited in claim 4, wherein on a following cycle, said count continues incrementing from said remainder.

6. An apparatus for high resolution speed control of a DC motor as recited in claim 5, wherein said count is utilized to generate a binary output by tapping off said most-significant bit of said count.

7. An apparatus for high resolution speed control of a DC motor as recited in claim 6, wherein an output waveform obtained from said most-significant bit of said count is an irregular waveform, which over a long period, produces an average output frequency of:

$$F_{MSB\ avg}=(F_{CLK}*\text{Phase Offset})/2^n,\text{ where}$$

$F_{MSB\ avg}$=an average output waveform frequency over $2^n$ clock cycles, and $F_{CLK}$=an input clock frequency.

8. An apparatus for high resolution speed control of a DC motor as recited in claim 7, wherein an entire cycle repeats at least every $2^n$ clock cycles, and wherein resolution of an output frequency is determined by a change in frequency produced by a change in an output of said phase offset circuit equal to one, producing a resulting absolute resolution in Hertz of $F_{clk}/2^n$.

9. An apparatus for high resolution speed control of a DC motor as recited in claim 1, wherein said motor control circuit comprises a phase-locked-loop.

10. An apparatus for high resolution speed control of a DC motor system comprising:
a DC motor assembly controlled by a reference frequency generation circuit, said reference frequency generation circuit comprising:
a crystal oscillator providing a cyclical reference signal, and
a phase accumulator having a phase offset circuit and a count register, said count register incrementing for each cycle of said cyclical reference signal, wherein an amount said count register increments is greater than one and is determined by said phase offset circuit, so that said phase accumulator sends a reference frequency to an input of said DC motor assembly, said crystal oscillator driving said phase accumulator.

11. An apparatus for high resolution speed control of a DC motor as recited in claim 10, further comprising a selectable post divide circuit for dividing an output of said phase accumulator by an integer of at least one.

12. An apparatus for high resolution speed control of a DC motor as recited in claim 10, wherein said DC motor assembly is an integrated DC motor assembly.

13. An apparatus for high resolution speed control of a DC motor as recited in claim 11, wherein said post divide circuit is based upon at least a most-significant bit of an output of said phase accumulator.

14. An apparatus for high resolution speed control of a DC motor system as recited in claim 10, further comprising a phase-locked loop to govern velocity of said DC motor.

15. An apparatus for high resolution speed control of a DC motor system as recited in claim 10, further comprising a speed discriminator system to govern velocity of said DC motor.

16. An apparatus for high resolution speed control of a DC motor system as recited in claim 10, further comprising a post divide circuit for dividing an output of said accumulator by an integer of at least one to preserve overall speed accuracy over a wide range.

17. An apparatus for high resolution speed control of a DC motor system as recited in claim 16, wherein a resulting reference clock which is sent to said DC motor has an average output frequency of:

$$F_{REFCLK\ Avg}=(F_{CLK}*\text{Phase Offset})/2^n*\text{Post Divide, where}$$

$F_{REFCLK\ Avg}$=an average frequency reference sent to said DC motor, $F_{CLK}$=an input clock frequency, Phase Offset=an amount to increment on each count, and n=a number of bits in said count, and Post Divide=an integer number.

18. An apparatus for high resolution speed control of a DC motor system as recited in claim 17, wherein a motor shaft frequency is determined by the following formula:

$$F_{MOTOR}=(F_{CLK}*\text{Phase Offset})/(2^n*\text{Post Divide}*\text{Motor IC Frequency Divide}*\text{Motor Feedback Ratio), where}$$

Motor IC Frequency Divide=a divide ratio set inside a driver IC of said DC motor, Motor Feedback Ratio=a ratio between cycles of one of an encoder, a Hall-effect, and a frequency generated feedback waveform per complete cycle of said motor shaft.

19. An apparatus for high resolution speed control of a DC motor system as recited in claim 10, wherein said phase accumulator has a relative resolution inversely proportional to an output frequency.

20. An apparatus for high resolution speed control of a DC motor system as recited in claim 10, further comprising a programmable binary divider disposed between said phase accumulator and said DC motor assembly to minimize degradation in said relative resolution.

21. An apparatus for high resolution speed control of a DC motor system as recited in claim 20, wherein a maximum timing error of said output signal is limited to plus or minus one half of one period of said phase accumulator input clock, when compared to an ideal clock with an equal average phase.

* * * * *